United States Patent [19]

Ishiguro

[11] Patent Number: 5,471,351

[45] Date of Patent: Nov. 28, 1995

[54] METHOD AND APPARATUS OF VERIFYING ACCURATE WRITING THROUGH COMPARISONS OF WRITTEN AND READ DATA

[75] Inventor: Masayuki Ishiguro, Kasugaishi, Japan

[73] Assignees: Fujitsu Limited, Kawasaki; Fujitsu VLSI Limited, Kasugai, both of Japan

[21] Appl. No.: 272,529

[22] Filed: Jul. 11, 1994

[30] Foreign Application Priority Data

Jul. 9, 1993 [JP] Japan .................... 5-170670

[51] Int. Cl.$^6$ .................... G11B 5/09; G11B 27/36
[52] U.S. Cl. .................... 360/53; 360/31
[58] Field of Search .................... 360/31, 53; 369/53, 369/54; 371/67.1

[56] References Cited

U.S. PATENT DOCUMENTS

| | | | |
|---|---|---|---|
| 5,142,422 | 8/1992 | Zook et al. | 360/53 |
| 5,255,270 | 10/1993 | Yanai et al. | 360/53 |
| 5,267,100 | 11/1993 | Ichijo et al. | 360/53 |
| 5,359,468 | 10/1994 | Rhodes et al. | 360/53 |

OTHER PUBLICATIONS

"Simplified Floppy–Disc Controller for Microcomputers", Kehl et al., Jun. 1976, pp. 91–97.

*Primary Examiner*—Aristotelis Psitos
*Assistant Examiner*—W. Chris Kim
*Attorney, Agent, or Firm*—Nikaido, Marmelstein, Murray & Oram

[57] ABSTRACT

A method is disclosed for verifying accurate writing of data onto a recording medium such as a disk. Data, provided to be written on the disk, is written onto the disk. The data written on the disk is read out from the disk. A user data portion in the data to be written on the disk is compared with a user data portion in the data read from the disk, so as to count a first number of errors between the both user data portions. An error correction on the data read from the disk is performed to count a second number of errors with respect to the user data portion in the read data. By comparing the first number of errors with the second number of errors, it is determined if data writing on the disk has been accomplished properly.

7 Claims, 10 Drawing Sheets

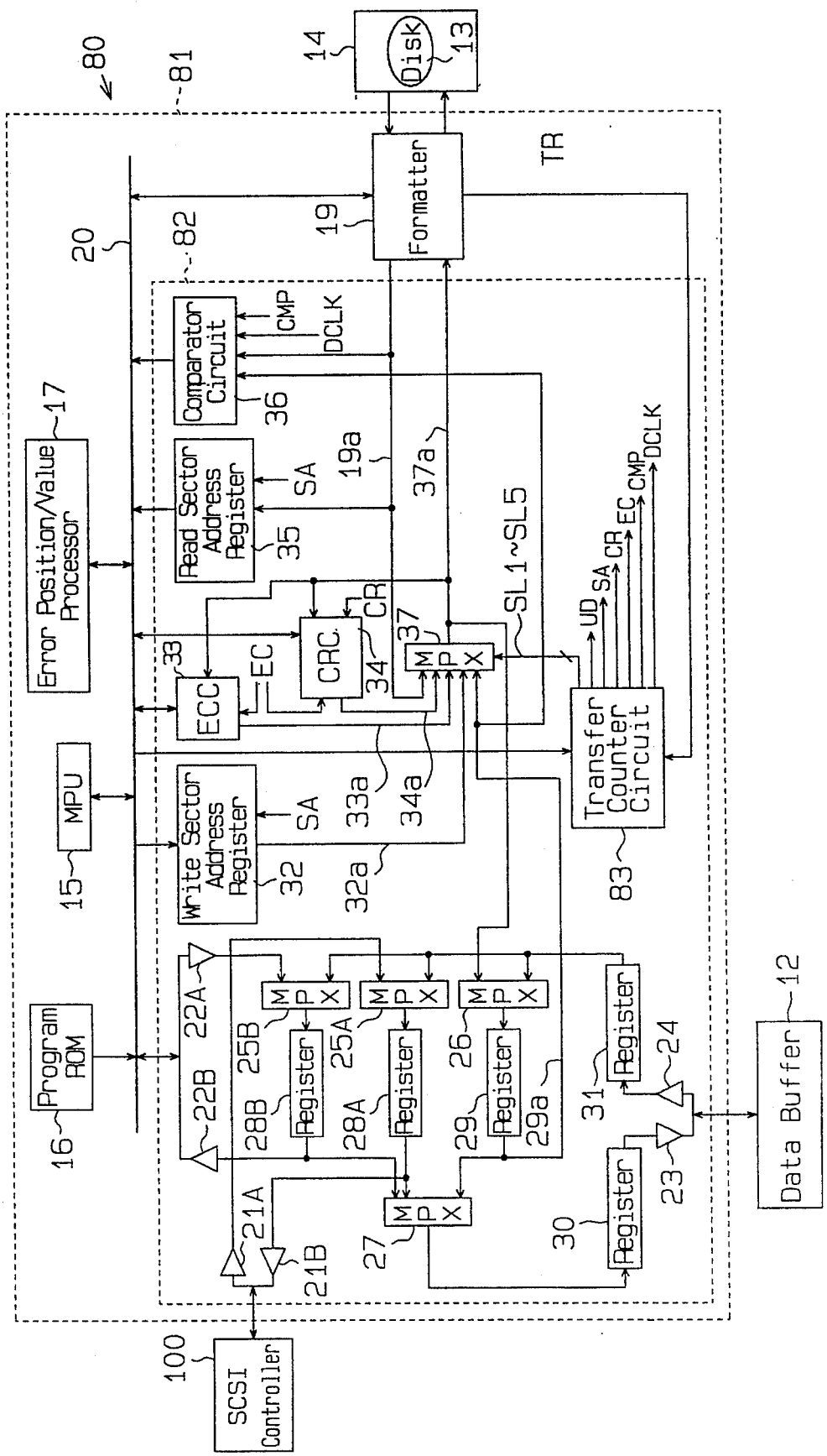

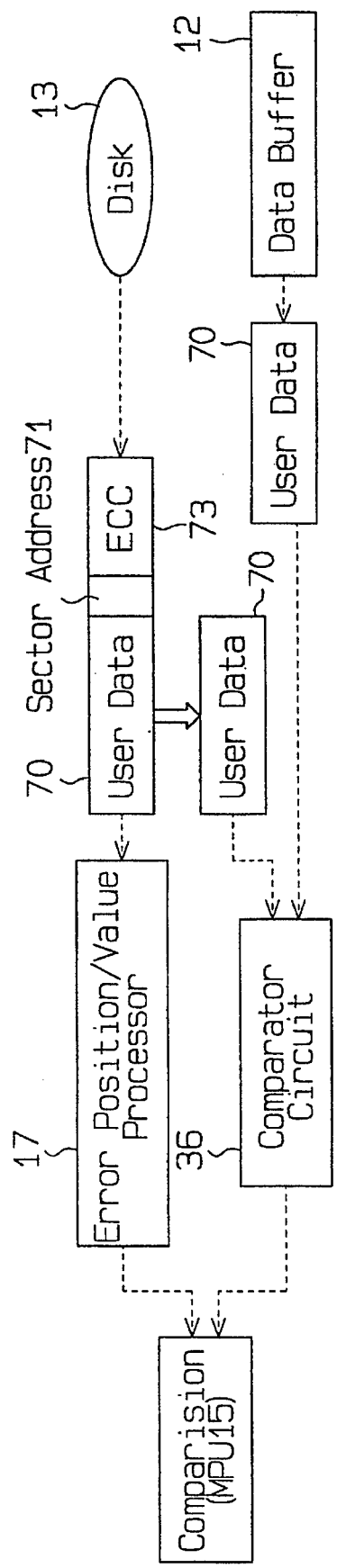

METHOD AND APPARATUS OF VERIFYING ACCURATE WRITING THROUGH COMPARISONS OF WRITTEN AND READ DATA

BACKGROUND OF THE INVENTION

1. Field of the Invention

The present invention relates to a disk apparatus which records data on a disk type recording medium, such as an optical disk or a magnetic disk, and which can reproduce data from the recording medium. More particularly, this invention relates to a method of testing if data has properly been written on a disk and to a disk apparatus which executes that method.

2. Description of the Related Art

In general, it is very important that disk recording and reproducing apparatuses not accidentally alter data which on the disk during their operation. That is, it is very important that such apparatuses be capable of maintaining the integrity of recorded disk data.

FIG. 1 shows a conventional disk apparatus 10, which comprises a control LSI 11, a dram constructed data buffer 12 and a disk drive 14 for driving a disk 13. The control LSI 11, here a one-chip structure, includes a microprocessing unit (MPU) 15, a program ROM 16, an error position/value processor 17, a data transfer controller 18 and a formatter 19. The MPU 15, program ROM 16, error position/value processor 17, data transfer controller 18 and formatter 19 are mutually connected by a bus 20 in the LSI 11. The data buffer 12 is connectable to an external bus (not shown) via a small computer system interface controller (SCSI controller 100).

The data transfer controller 18 controls the byte-by-byte transfer of binary data between the data buffer 12 and the formatter 19 based on a control signal from the MPU 15. The formatter 19 has a parallel-to-serial converter, a serial-to-parallel converter and a modulator/demodulator (none on which are shown). At the time data is written on the disk 13, the formatter 19 converts parallel data, sent byte by byte from the data transfer controller 18, into serial data, and modulates this serial data to run-length limited (RLL) code data. The formatter 19 then adds a sync pattern to this RLL code data to synchronize data flow between the control LSI 11 and the disk drive 14, and outputs the resultant data as data to be written on the disk 13.

The formatter 19 receives data read from the disk 13 by the disk drive 14, and removes the sync pattern from that data. Then, the formatter 19 demodulates the RLL code data to serial binary data, converts the serial data to parallel data, and sends the parallel data as read data 19a to the data transfer controller 18. Read data generally consists of a 512-byte user data portion 70, a 4-byte sector address portion 71, a 4-byte cyclic redundancy check (CRC) code portion 72, and an 80-byte parity 73 (i.e., ECC code portion: error-correction coding portion), as shown in FIG. 8.

The details of the data transfer controller 18 will now be discussed with reference to FIG. 1. The controller 18 includes six buffers 21A, 21B, 22A, 22B, 23 and 24. The buffer 21A has an input terminal connected to the SCSI controller 100 and an output terminal connected to a first multiplexer 25A. The buffer 24 has an input terminal connected to the data buffer 12 and an output terminal connected to a register 31. The output of the register 31 is input to the first multiplexer 25A, a second multiplexer 25B and a third multiplexer 26. The output of the first multiplexer 25A is input to a register 28A, which is connected to a forth multiplexer 27 and connected via the buffer 21B to the SCSI controller 100. The second multiplexer 25B is connected via the buffer 22A to the bus 20. The output terminal of the second multiplexer 25B is connected to a register 28B, which is connected to the forth multiplexer 27 and connected via the buffer 22B to the bus 20.

The third multiplexer 26 has an input terminal at which it receives the output of a fifth multiplexer 37, and an output terminal connected to a register 29. The output terminal of the register 29 is connected to the fourth multiplexer 27 and the fifth multiplexer 37. The output terminal of the fourth multiplexer 27 is connected via a register 30 and the buffer 23 to the data buffer 12.

User data, sent from a high-order computer (not shown) connected to the SCSI, is written into the data buffer 12 via the SCSI controller 100, buffer 21A, first multiplexer 25A, register 28A, fourth multiplexer 27, register 30 and buffer 23, in response to the control signal from the MPU 15. The user data is written byte by byte in parallel form. Data from the data buffer 12 is loaded into the high-order computer via the buffer 24, register 31, first multiplexer 25A, register 28A, buffer 21B, and SCSI controller 100, in response to the control signal from the MPU 15. This data reading operation is also performed byte by byte in parallel form.

The data transfer controller 18 has a write sector address register 32, an ECC/syndrome processor 33, a cyclic redundancy check (CRC) processor 34, a read sector address register 35, a comparator circuit 36 and a transfer counter circuit 38, all of which are connected to the bus 20. The read sector address register 35 and comparator circuit 36 are connected directly to the formatter 19. The comparator circuit 36 is also connected to the fifth multiplexer 37.

FIG. 2 shows the transfer counter circuit 38, which has first and second counters 57 and 58, a decoder 59 and a data flip-flop 62. Each of the counter 57 and 58 has a clear terminal CL to which a reset signal/RESET from the MPU 15 is input, and a clock terminal CK to which a clock signal CLK is input. The second counter 58 has a count enable terminal CE where the output signal, Q, from the data flip-flop 62 is received. The second counter 58 further has a load terminal/L to which a signal ILV2 representing the $2^2$-th digit output from this counter 58 is input via an inverter 65. An AND gate 64 in the transfer counter circuit 38 has a first input terminal to receive the output signal Q from the data flip-flop 62, and a second input terminal to receive the signal ILV2 from the second counter 58.

When the reset signal/RESET is at a L level, the individual counters 57 and 58 are reset. When both the reset signal RESET and the output signal Q of the data flip-flop 62 are high, the second counter 58 executes a counting operation and outputs signals ILV0 to ILV2, respectively representing the $2^0$-th digit to the $2^2$-th digit, every time the clock signal CLK is input. When the signal ILV2 from the second counter 58 is "1" or the count value becomes "4", the output of the inverter 65 becomes "0". When the next clock signal CLK is input, therefore, the count value of the counter 58 becomes "0". In other words, the second counter 58 repeatedly counts from "0" to "4". When the signal ILV2 from the counter 58 becomes "1", the output of the AND gate 64 goes high. At this time, the first counter 57 is enabled to perform the counting operation based on the received clock signal CLK and outputs signals representing the $2^0$-th to $2^6$-th digits.

The decoder 59 decodes the signals from the first counter 57 and the signals ILV0–ILV2 from the second counter 58, and outputs control signals UD, SA, CR and EC. The timing of these control signals, as governed by the first counter 57, is explained as follows.

When the count value of the first counter reaches "102", the control signal UD is output until the set of the signals from the second counter 58, "ILV0, ILV1, ILV2", is "1, 0, 0".

When both the count value of the first counter 57 is "102" and the set of the signals from the second counter 58, "ILV0, ILV1, ILV2", is "0, 1, 0", control signal SA is output from decoder 59 until both the count value of the counter 57 is "103" and the set of the signals from the counter 58 is "0, 0, 1.

When the count value of the first counter 57 is "103" and the set of the signals from the second counter 58, "ILV0, ILV1, ILV2", is "1, 0, 0", control signal CR is output from decoder 59 until the count value of the counter 57 is "103" and the set of the signals from the counter 58 is "0, 0, 1".

When the count value of the first counter 57 is "104" and when the set of the signals from the second counter 58, "ILV0, ILV1, ILV2", is "0, 0, 0", the decoder 59 outputs the control signal EC until a time when both the count value of the counter 57 is "119" and the set of the signals from the counter 58 is "0, 0, 1".

Finally, when the count value of the first counter 57 is "120" and the set of the signals from the second counter 58, "ILV0, ILV1, ILV2", is "0, 0, 0", the decoder 59 outputs a H-level end signal EN indicating the end of one sector of data.

The AND gate 61 in the transfer counter circuit 38 receives an inverted output signal/Q of the data flip-flop 62, a transfer request signal TR from the formatter 19 and the end signal EN from the decoder 59 via the inverter 60. The AND gate 61 then outputs a signal to the data terminal D of the data flip-flop 62. The data flip-flop 62 also has a clock terminal CK that receives the clock signal CLK, and a clear terminal CL that receives the reset signal/RESET.

When the reset signal/RESET is low, the data flip-flop 62 is reset to output the inverted output signal/Q at a high level. When the reset signal/RESET, the inverted output signal/Q from the data flip-flop 62 and the transfer request signal TR are all high, and when the end signal EN is low, the output of the AND gate 61 goes high. At this time, the data flip-flop 62 latches at a value of "1" in response to the clock signal CLK. Consequently, the output signal Q goes high and the inverted output signal/Q goes low.

The inverted output signal/Q from the data flip-flop 62, along with the clock signal CLK are next provided to a NOR gate 63 in the transfer counter circuit 38. When the inverted output signal/Q goes low, the NOR gate 63 outputs a transfer clock signal DCLK, as an inverted clock signal CLK, to the comparator circuit 36. The transfer counter circuit 38 further includes buffers 50 and 51, an OR gate 52 and AND gates 53 to 56. The buffer 50 outputs a write verify signal VER from the MPU 15, instructing write verification, as a compare signal CMP. The buffer 51 outputs a read enable signal RE from the MPU 15 directly as a select signal SL1. The OR gate 52 provides an output signal based on the write verify signal VER and a write enable signal WE. The output signal is sent to the AND gates 53 to 56. The AND gates 53–56 respectively receive the control signals UD, SA, CR and EC.

The AND gate 53 outputs a H-level select signal SL5 when the write verify signal VER or write enable signal WE are high and when the control signal UD is high. The AND gate 54 outputs a H-level select signal SL4 when either the write verify signal VER or write enable signal WE are high and when the control signal SA is high. The AND gate 55 outputs a H-level select signal SL2 when either the write verify signal VER or write enable signal WE are high and when the control signal CR is high. Finally, the AND gate 56 outputs a H-level select signal SL3 when either the write verify signal VER or write enable signal WE are high and when the control signal EC is also high.

As shown in FIG. 1, the fifth multiplexer 37 has five input terminals respectively connected to the formatter 19, write sector address register 32, ECC/syndrome processor 33, CRC processor 34 and register 29. The output terminal of the multiplexer 37 is connected to the ECC/syndrome processor 33, CRC processor 34, formatter 19 and third multiplexer 26.

The fifth multiplexer 37 receives the five select signals SL1 to SL5 from the transfer counter circuit 38. Based on the select signals SL1–SL5, the multiplexer 37 selects one of the signals input to its input terminals and outputs the selected signal as an output signal 37a. For example, when signal SL1 alone from the signal SL1–SL5 is "1", read data 19a from the formatter 19 is output as signal 37a. When only the select signal SL2 is "1", the signal, 34a of the CRC processor 34 is output as the output signal 37a. When only the select signal SL3 is "1", the output signal, 33a, of the ECC/syndrome processor 33 is output as signal 37a. When only the select signal SL4 is "1", the output signal, 32a, of the write sector address register 32 is output as signal 37a. When the select signal SL5 alone is "1", the output signal, 29a, of the register 29 is output as signal 37a.

A 4 byte sector address, at which data should be written on a disk, is previously stored in the write sector address register 32 by the MPU 15. The write sector address register 32 receives the control signal SA from the transfer counter circuit 38. The address register 32 then outputs the sector address byte by byte only when the control signal SA is "1", i.e., the register 32 will not output the sector address when the control signal SA is "0".

The CRC processor 34 then receives the control signals EC and CR from the transfer counter circuit 38. When the control signals EC and CR are "0", the processor 34 executes a CRC operation, based in part on the user data portion 70, and then outputs the resulting signal 34a to the multiplexer 37, which in turn outputs the signal 37a to the formatter 19. When the sector address data is stored in the write sector address register 32, the processor 34 executes a CRC operation based on the user data and sector address data. The processor 34 outputs the result of the CRC operation to the multiplexer 37 when the control signal CR alone is "1". The processor 34 is disabled when the control signal EC alone is "1".

The ECC/syndrome processor 33 receives the control signal EC from the transfer counter circuit 38. When the control signal EC is "0", the processor 33 executes an ECC operation to produce parity in the error correction, based on the user data or the output signal 37a of the multiplexer 37 and the result of the CRC operation. When the sector address data is stored in the write sector address register 32, the processor 33 executes the ECC operation based on the user data, sector address data and the result of the CRC operation.

Generally, the user data, sector address data and CRC data (the result of the CRC processing) are classified into five interleaves as shown in FIG. 9. The ECC operation is performed for each interleave. When the control signal EC becomes "1", the ECC/syndrome processor 33 outputs the result of the ECC operation to the fifth multiplexer 37 and the error position/value processor 17. When data is read from the disk, the CRC produced by the CRC processor 34 is affixed to the read data in order to check if the result of the error correction done by the ECC/syndrome processor 33 were accurate.

The read sector address register 35 receives the control signal SA from the transfer counter circuit 38. When the control signal SA is "0", the address register 35 holds the sector address data (4 bytes) based on the read data 19a from the formatter 19. The address register 35 sends the held data onto the bus 20.

FIG. 5 shows the comparator circuit 36, which is the same as the one used in a preferred embodiment of the present invention. The comparator circuit 36 includes a comparator 40, which compares one byte input data A, supplied as the signal 19a, with one byte input data B, supplied as the signal 37a. The result of the comparison, signal S1 is output from the comparator circuit 36.

The comparator 40 has eight EXOR gates 46a to 46h and one OR gate 47, as shown in FIG. 6. The EXOR gates 46a–46h respectively receive bits a0 to a7 of the input data A and bits b0 to b7 of the input data B. The output signal of each EXOR gate is set to "1" when the pair of bits ai and bi ("i" being 0 to 7) have different signal levels. The OR gate 47 outputs the comparison signal S1 having an H level when the output signal of any one of the EXOR gates 46a–46h is "1".

The comparator circuit 36 further includes a decoder 41, five AND gates 42a to 42e, five counters 43a to 43e and five NAND gates 44a to 44e. The decoder 41 decodes the signals ILV0–ILV2, received from the transfer counter circuit 38, to yield decode signals D0 to D4, and outputs those signals D0–D4. The decode signal D0 alone is set to "1" when the signal set "ILV0, ILV1, ILV2" is "0, 0, 0". The decode signal D1 alone is set to "1" when the signal set "ILV0, ILV1, ILV2" is "1, 0, 0". The decode signal D2 alone is set to "1" when the signal set "ILV0, ILV1, ILV2" is "0, 1, 0". The decode signal D3 alone is set to "1" when the signal set "ILV0, ILV1, ILV2" is "1, 1, 0". The decode signal D4 alone is set to "1" when the signal set "ILV0, ILV1, ILV2" is "0, 0, 1".

Each of the AND gates 42a–42e has a first input terminal connected to the output terminal of one of the associated NAND gates 44a–44e, a second input terminal to receive the comparison signal S1 from the comparator 40, and a third input terminal to receive one of the associated decode signals D0–D4. The output terminals of the AND gates 42a–42e are connected to the count enable terminals CE of the associated counters 43a–43e. Each of the counters 43a–43e has a clear terminal CL where the reset signal/RESET is received and a clock terminal CK connected to the output terminal of the NAND gate 45. The NAND gate 45 receives the compare signal CMP and transfers clock signal DCLK from the transfer counter circuit 38. Each of the counters 43a–43e outputs four signals representing the $2^0$-th digit, $2^1$-th digit, $2^2$-th digit and $2^3$-th digit, respectively. Each of the NAND gates 44a–44e receives the $2^0$-th digit signal and the $2^3$-th digit signal from the associated counter 43a–43e.

When the reset signal/RESET goes low, the counters 43a–43e are reset. When the reset signal /RESET goes high, the counters 43a–43e are enabled to perform a counting operation. When the comparison signal S1 is high, the counter associated with any one of the decode signals D0–D4 at a "1" level performs the counting operation. That is, the counters 43a–43e each count the number of errors (i.e., the number of unmatches) in the individual interleaves.

When the count value in each of the counters 43a–43e reaches "9", the associated NAND gate 44a–44e has its output set low. As a result, that counter stops the counting operation.

In data reading mode or write verification mode, the error position/value processor 17 computes the error position and value in a data sequence, based on the result of the operation in the ECC/syndrome processor 33 and on the result of the comparison in the comparator circuit 36.

As described above, the conventional disk apparatus 10 can carry out the write verification according to the procedures as shown in FIG. 3A or 3B.

According to the procedure in FIG. 3A, in performing the write verification, first, user data in the data to be written is previously written in the data buffer 12. Sector address data is previously written in the write sector address register 32. When the MPU 15 outputs a H-level write verify signal VER thereafter, the transfer counter circuit 38 outputs a H-level compare signal CMP. At this time, the output of the OR gate 52 in the transfer counter circuit 38 is set high.

When the transfer request signal TR from the formatter 19 is input to the transfer counter circuit 38, the counters 57 and 58 are enabled to perform a counting operation and the inverted output signal/Q of the data flip-flop 62 set low. The comparator circuit 36 receives the read data 19a, read from the disk 13 via the formatter 19. Every time the clock signal CLK is input, the second counter 58 performs the counting operation to see which interleave has the current focus, and outputs the signals ILV0–ILV2 according to the counting result. When the signal ILV2 from the second counter 58 is set as "1", the first counter 57 is enabled and, in response to the clock signal Clk, performs a counting operation to identify which data in the interleave is currently being processed. Every time the clock signal CLK is input, the NOR gate 63 outputs an inverted clock signal CLK as the transfer clock signal DCLK.

The control signal UD remains high until the set of the signals from the second counter 58, "ILV0, ILV1, ILV2", changes to "0, 1, 0" at a time that the count value of the first counter 57 is "102". The time the control signal UD remains high, the select signal SL5 is set to a high level. At this time, the multiplexer 37 selects the user data from the data buffer 12 and outputs it as the output signal 37a to the comparator circuit 36. This selected user data is also sent to the ECC/ syndrome processor 33 and CRC processor 34.

The comparator circuit 36 compares the user data in the data to be written to the disk, with the user data in the read data from the formatter 19 bit by bit, and outputs the comparison signal S1 according to the comparison result. The comparator 36 then counts the number of unmatched bytes in each interleave.

The control signal SA remains at a high level until the set of the signals from the second counter 58, "ILV0, ILV1, ILV2", changes to "1,0, 0" at a time that the count value of the first counter 57 is "103". During the H-level duration of the control signal SA, the select signal SL2 is set high. At this time, the multiplexer 37 selects the sector address data from the write sector address register 32 and outputs it as the output signal 37a to the comparator circuit 36. This sector address data is also sent to the ECC/syndrome processor 33 and CRC processor 34.

The comparator circuit 36 then compares the sector address data, as a portion of the data to be written to disk, with the sector address data in the read data provided by the formatter 19 bit by bit comparator circuit 36 next outputs the resulting comparison signal S1, and counts the number of unmatched bytes in each interleave. The CRC processor 34 executes a CRC operation based on the user data and the sector address data from the multiplexer 37.

The output of the control signal CR starts when the count value of the first counter 57 is "103" and the set of the signals from the second counter 58, "ILV0 ILV1 ILV2" is "0, 1, 0". This output of the control signal CR continues until the signal set changes to "0, 0, 1" at a time when the count value of the first counter 57 is "103". During the time that control signal CR remains high, the select signal SL4 will also remain high. Accordingly, the multiplexer 37 selects the result of the operation in the CRC processor 34 and outputs it as the output signal 37a to the comparator circuit 36 and to the ECC/syndrome processor 33.

The comparator circuit 36 compares the CRC code portion in the data to be written with the CRC code portion in the read data from the formatter 19, outputs the comparison signal S1 according to the comparison result and counts the number of unmatched byte in each interleave. The ECC/syndrome processor 33 executes an ECC operation, based on the user data, the sector address data and the result of the CRC operation from the multiplexer 37.

The output of the control signal EC starts when the count value of the first counter 57 is "104" and when the set of the signals from the second counter 58, "ILV0, ILV1, ILV2", is "0, 0, 0". This output of the control signal EC continues until the signal set from the second counter 58 changes to "0, 0, 1" at a time that the count value of the first counter 57 is "119". During the time which control signal EC remains at a high level, the select signal SL3 also remains high. Accordingly, the multiplexer 37 selects the result of the operation executed by the ECC/syndrome processor 33 and outputs it as the output signal 37a to the comparator circuit 36.

The comparator circuit 36 compares the ECC code portion in the data to be written with the ECC code portion in the read data from the formatter 19, outputs the comparison signal S1 according to the comparison result, and counts the number of unmatched bytes in each interleave.

According to this verification method, the data writing operation to a disk is determined as being successful as long as the number of unmatched bytes found in the comparison between the written data and the read data is equal to or lower than a predetermined reference value defined by the ECC production multinominal expression assigned to each interleave. This is because when the number of the unmatched bytes is equal to or lower than the reference value, error correction of data can automatically be performed at the time when the data is read from the disk in modes other than the write verification mode.

According to the conventional verification, error correction is not performed on the read data in write verification mode. Even if there is an error in the sector address data, the sector address is used as correct one. Consequently, at the time data is read from the disk 13, a wrong sector may be verified for the purpose of write verification, and data written to the disk may erroneously be determined as having been done successfully. In the case of an optical disk which has very narrow track pitches of at most 1.6 µm, for example, the reading of a wrong sector is likely to occur.

Another method conventionally used for write verification is shown in FIG. 36. Based on the data read from the disk 13 and on the results of the comparison performed by the comparator circuit 36, the ECC/syndrome processor 33 enables the error position/value processor 17 to compute the position of the error in the data read from the disk. According to this method, the data writing operation is determined to have been successful when the number of errors in the read data is equal to or lower than a predetermined reference value.

However, at the time of writing data to the disk 13, should it be the case that, data at a given disk location can not be erased or that data cannot be written at that address location. Old data will inevitably remain on the disk 13. If the number of errors is equal to or less than the reference value after error correction is performed on the old data, the write verification method would erroneously determine that data has accurately been written on the disk.

SUMMARY OF THE INVENTION

Accordingly, it is a primary objective of the present invention to provide a method of accurately verifying whether data, written to a recording medium such as a disk, has been successfully written to the recording medium. In particular, the present invention aims at preventing a wrong sector on a disk from being used in the write verification process to indicate whether data has successfully been written to disk. The present invention further aims to correctly determine whether data writing operations have been successful when prerecorded disk data inhibits the data writing operation.

It is another objective of the present invention to provide an apparatus which executes the method embodying this invention.

To achieve the foregoing and other objects and in accordance with the purpose of the present invention, an improved method is provided for verifying accurate writing of data onto a recording medium. The data on the medium includes at least a user data portion. The method according to the present invention comprises the steps of:

providing data to be written on the recording medium;

writing the provided data onto the recording medium;

reading data written on the recording medium from the recording medium;

comparing the user data portion in the data to be written on the recording medium with a user data portion in the data read from the recording medium, so as to count a first number of errors between the both user data portions;

performing an error correction on the data read from the recording medium, to count a second number of errors with respect to the user data portion in the read data; and comparing the first number of errors with the second number of errors, so as to determine if data writing on the recording medium has been accomplished properly.

The apparatus according to the present invention controls data transfer between a disk driver for a disk as a recording medium and a data buffer, and verifies if data is correctly written on the recording medium in response to a verification signal (VER). The apparatus includes a formatter for exchanging data between the apparatus and the disk driver, and a comparator circuit having first and second terminals for receiving data. The comparator circuit compares two pieces of data respectively input to the first and second terminals in order to count a first number of errors representing a number of unmatches between the two pieces of data. The first terminal receives data, read from the disk, via the formatter. In the apparatus, there is a first connecting circuit for supplying data to be written on the disk to the data buffer, and a second connecting circuit, provided between the data buffer and the second terminal of the comparator circuit, for supplying data from the data buffer to the comparator circuit.

The apparatus further includes an error correction processor, a transfer control circuit, and a determining unit. The error correction processor executes an error correcting operation to produce a parity based on received data, and counts a second number of errors in the received data. The transfer control circuit controls data supply to the error correction processor, and in response to the verification signal (VER) keeps supplying data from the formatter to the error correction processor as long as the apparatus is in write verification mode. The determining unit compares the first number of errors with the second number of errors to verify the accuracy of the data writing operation, i.e., to determine if data written to the recording medium has in fact been accomplished accurately.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings.

FIGS. 4 through 10 illustrate one embodiment of the present invention:

FIG. 4 is a block diagram illustrating a disk apparatus;

FIG. 5 is a circuit diagram showing a comparator circuit incorporated in the disk apparatuses in FIGS. 1 and 4;

FIG. 6 is a circuit diagram showing a comparator incorporated in the comparator circuit shown in FIG. 5;

FIG. 7 is a circuit diagram showing a transfer counter circuit according to the present invention, incorporated in the disk apparatus in FIG. 4;

FIG. 8 is a diagram showing read data output from a formatter incorporated in the disk apparatus shown in FIG. 4;

FIG. 9 is an explanatory diagram showing error correction groups; and

FIG. 10 is a chart illustrating a verification method using the disk apparatus shown in FIG. 4.

DETAILED DESCRIPTION OF THE PREFERRED EMBODIMENT

Figure 1:
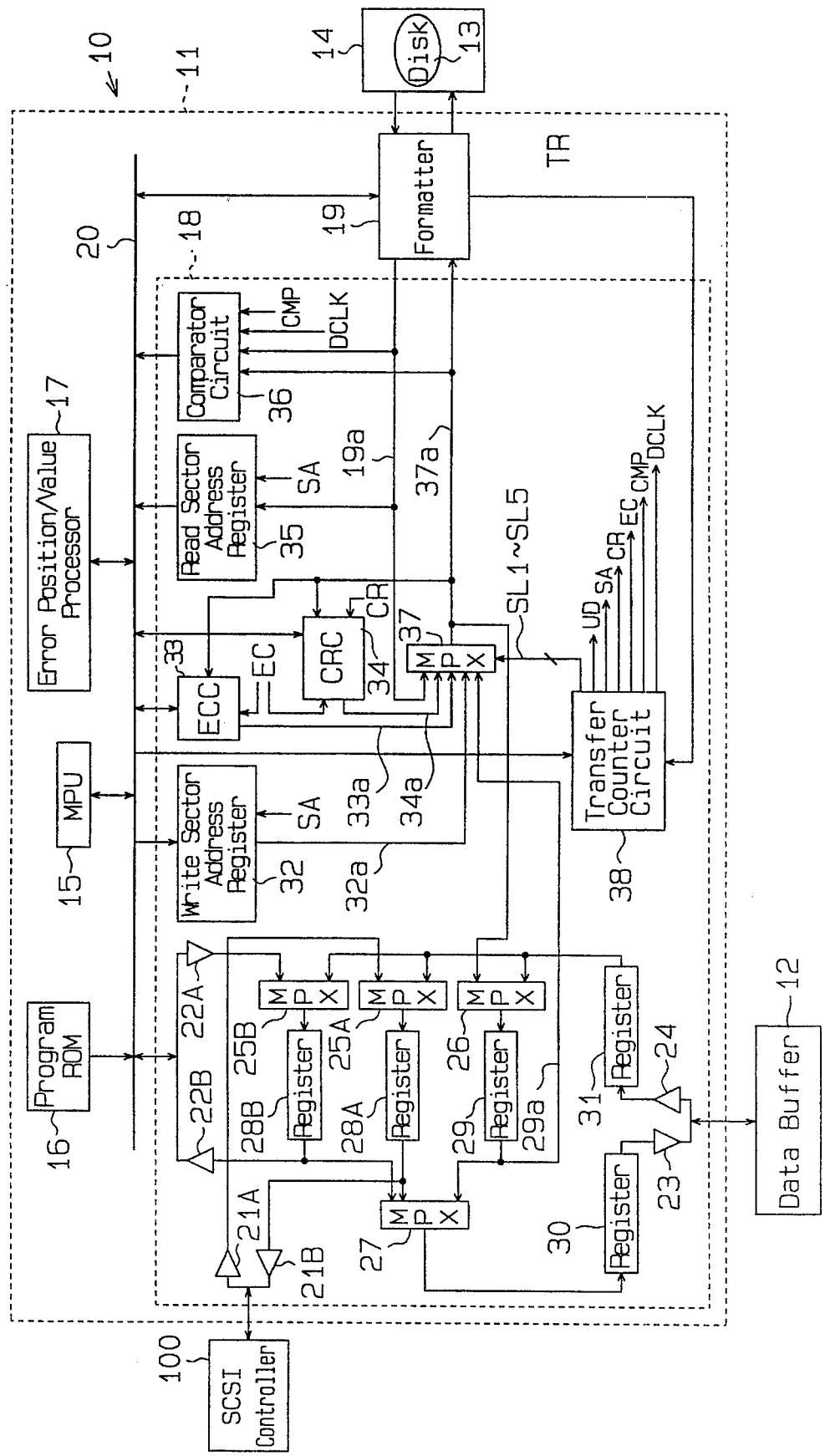
FIG. 1 is a block diagram illustrating a conventional disk apparatus.
Figure 2:
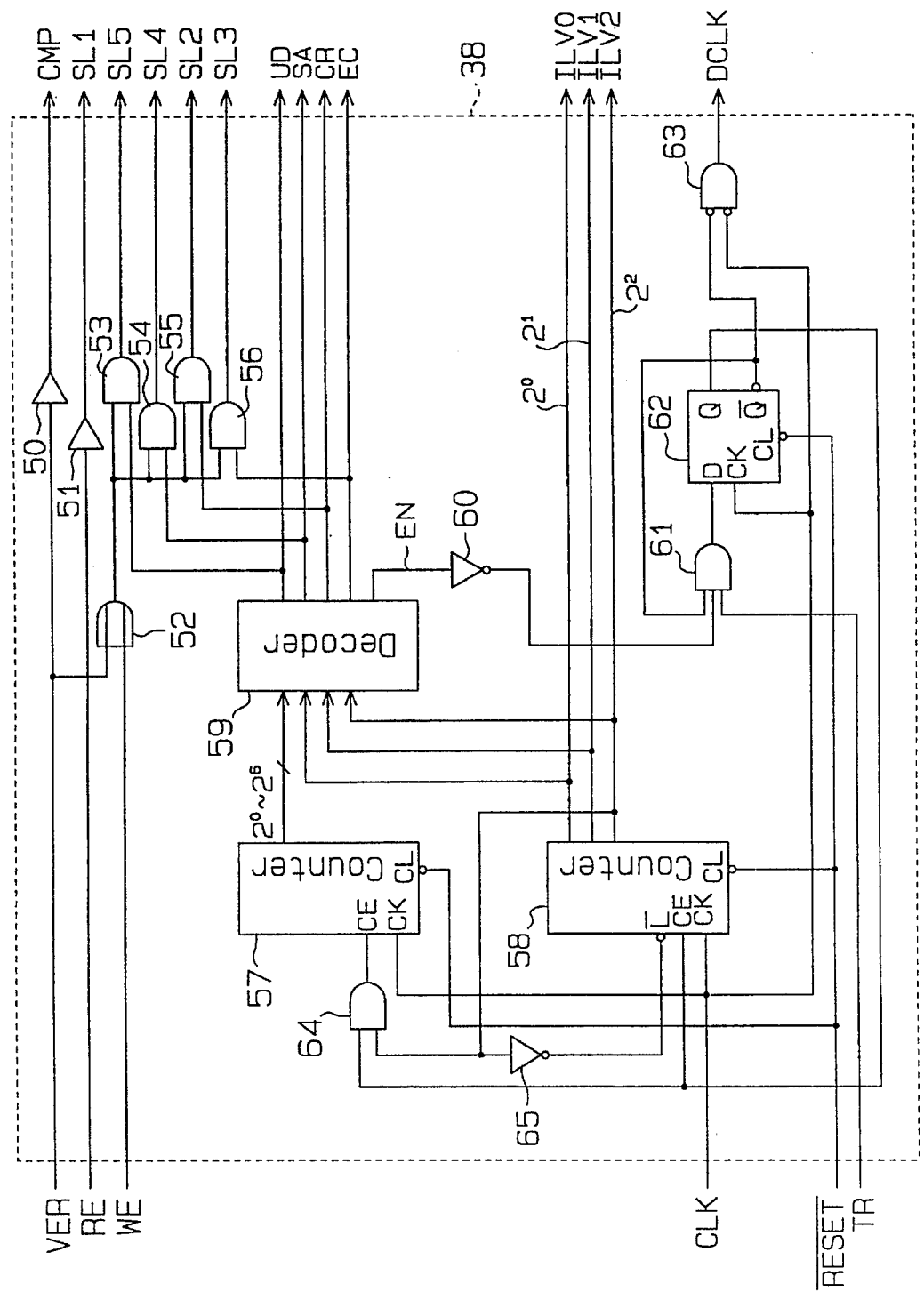
FIG. 2 is a circuit diagram showing a conventional transfer counter circuit incorporated in the disk apparatus shown in FIG. 1.
Figure 3A:
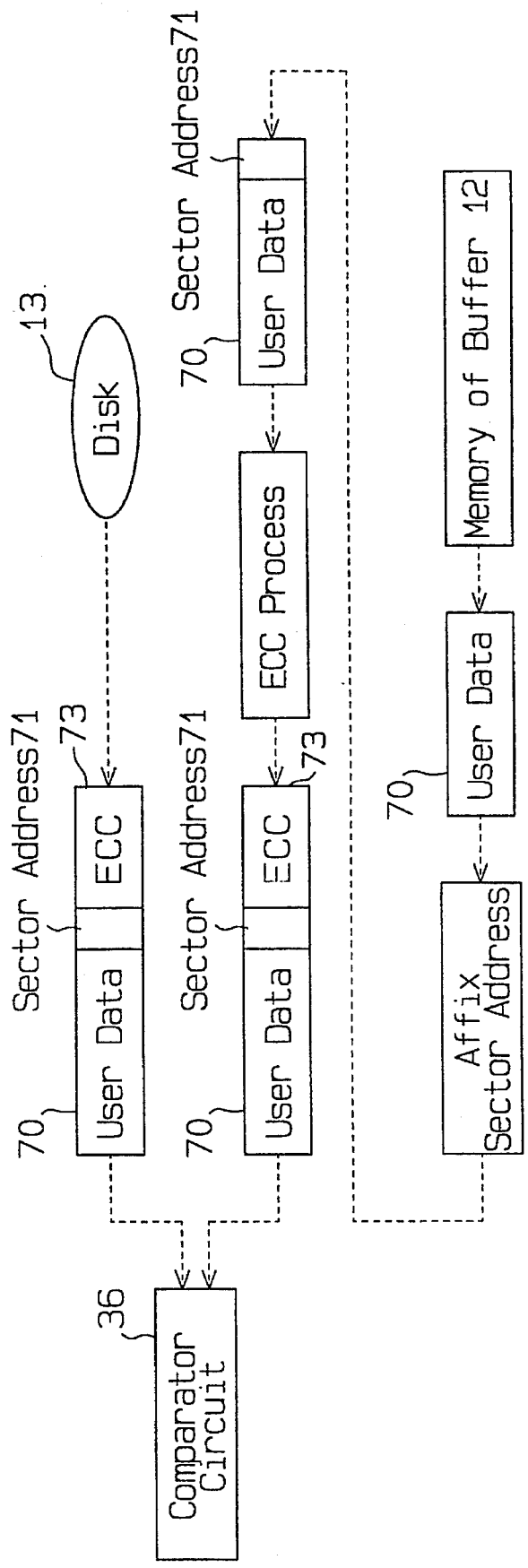
FIGS. 3A and 3B are charts illustrating conventional verification methods using the disk apparatus shown in FIG. 1.
Figure 3B:
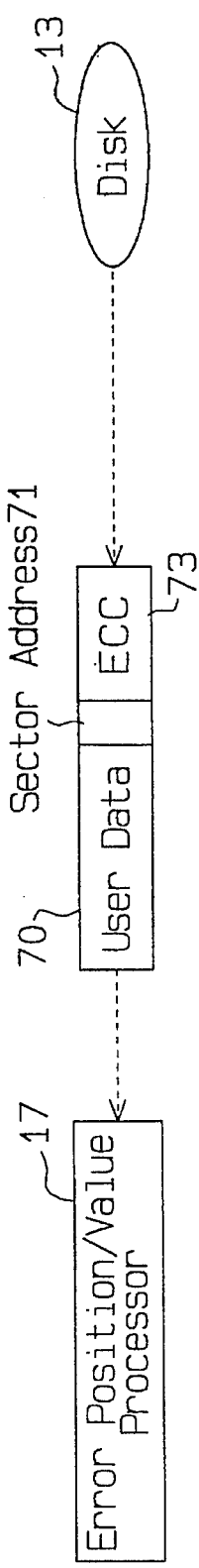
Figure 5:
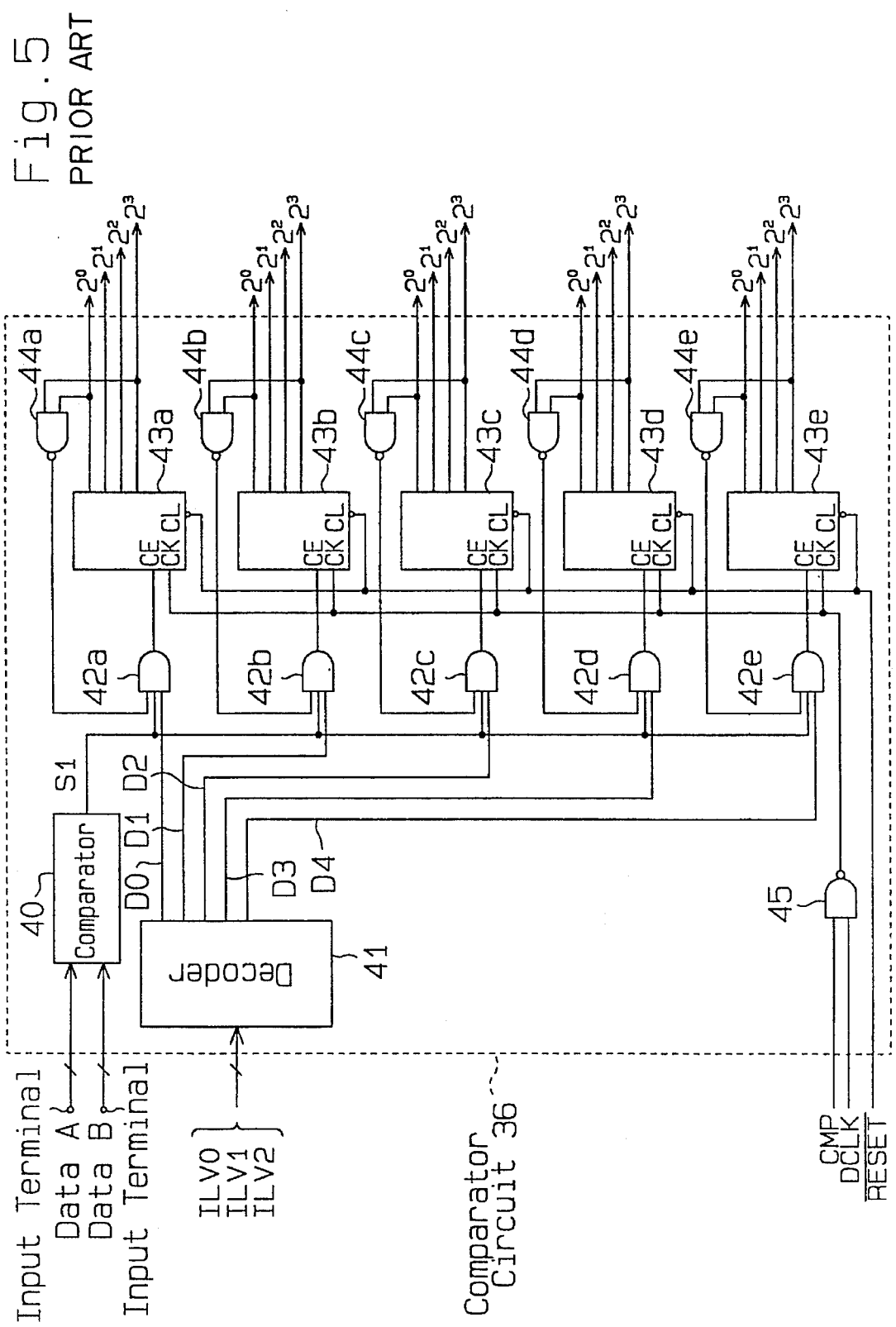
Figure 6:
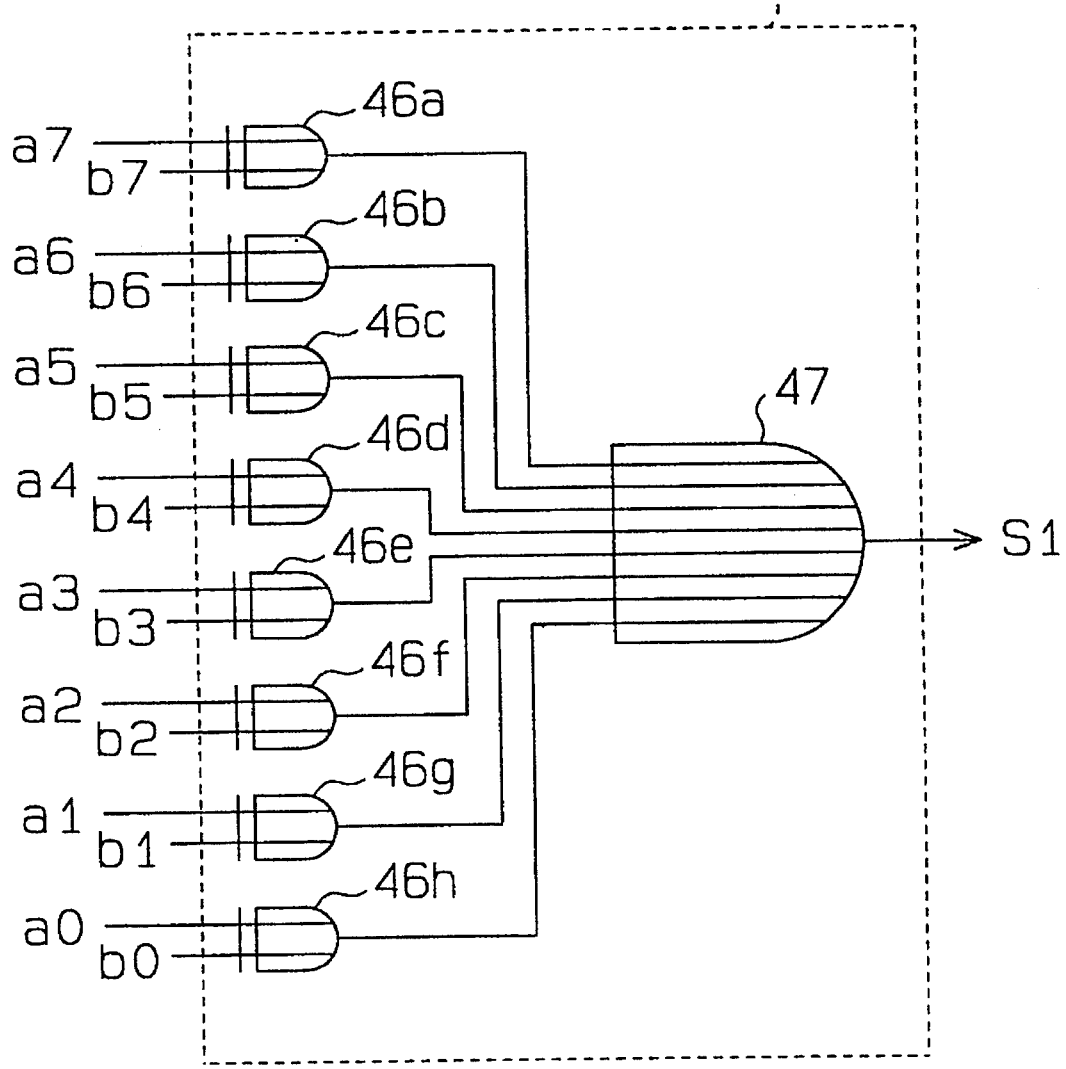

A disk apparatus according to one embodiment of the present invention will now be described referring to FIGS. 4 through 10. To avoid a repetitive description, the same or similar reference numerals as used in FIGS. 1 and 2 will be used to denote the same or similar elements of this embodiment. Further, the differences between this disk apparatus and the above-described conventional disk apparatus will be described below.

FIG. 4 shows a disk apparatus 80 according to this embodiment. The comparator circuit 36 of this disk apparatus 80, unlike the one in the conventional disk apparatus 10, receives the output signal 29a from the register 29 directly in addition to read data 19a from the formatter 19. In addition, this disk apparatus 80 has a transfer counter circuit 83 different from the conventional transfer counter circuit 38.

Figure 7:
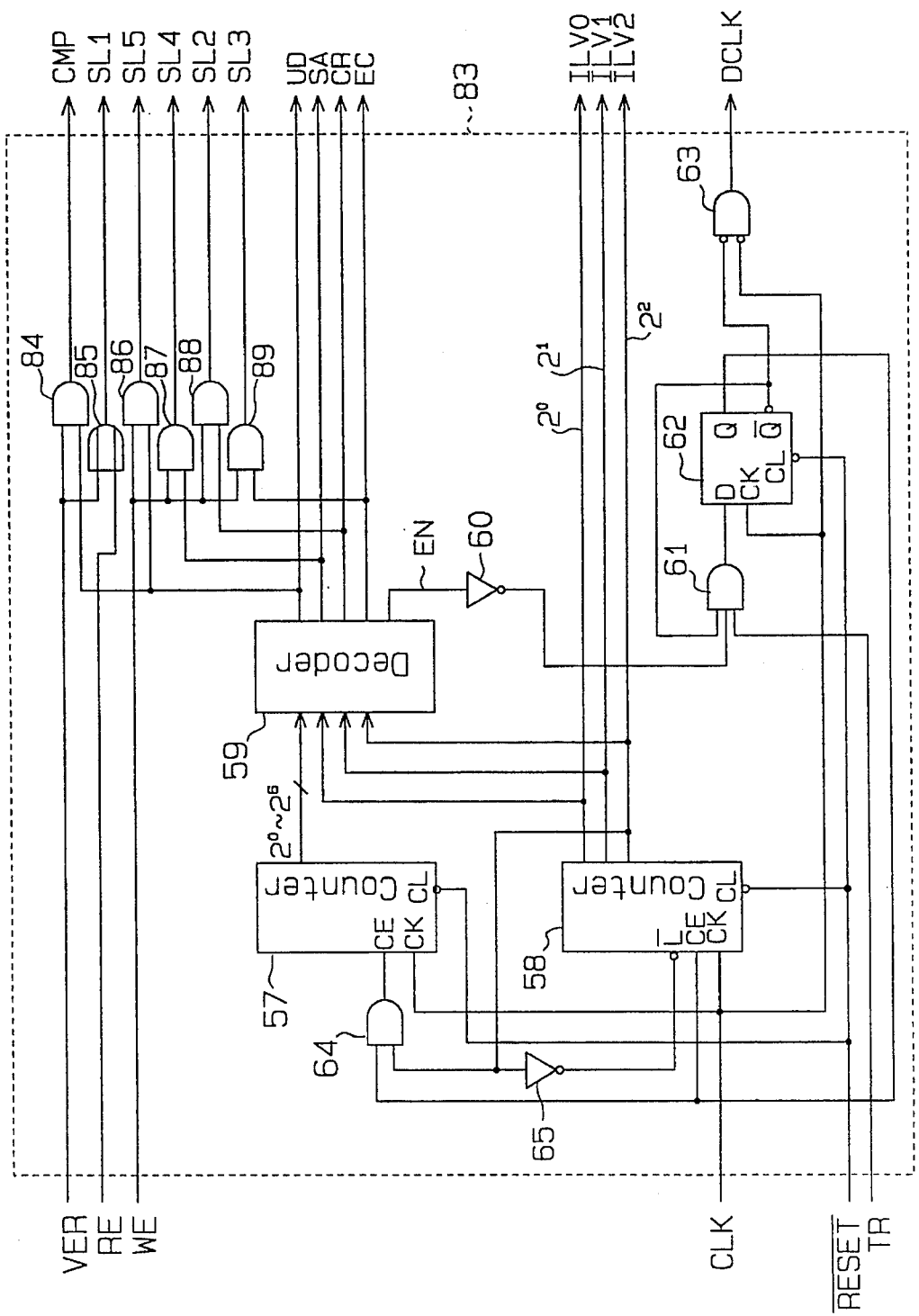
Figure 8:
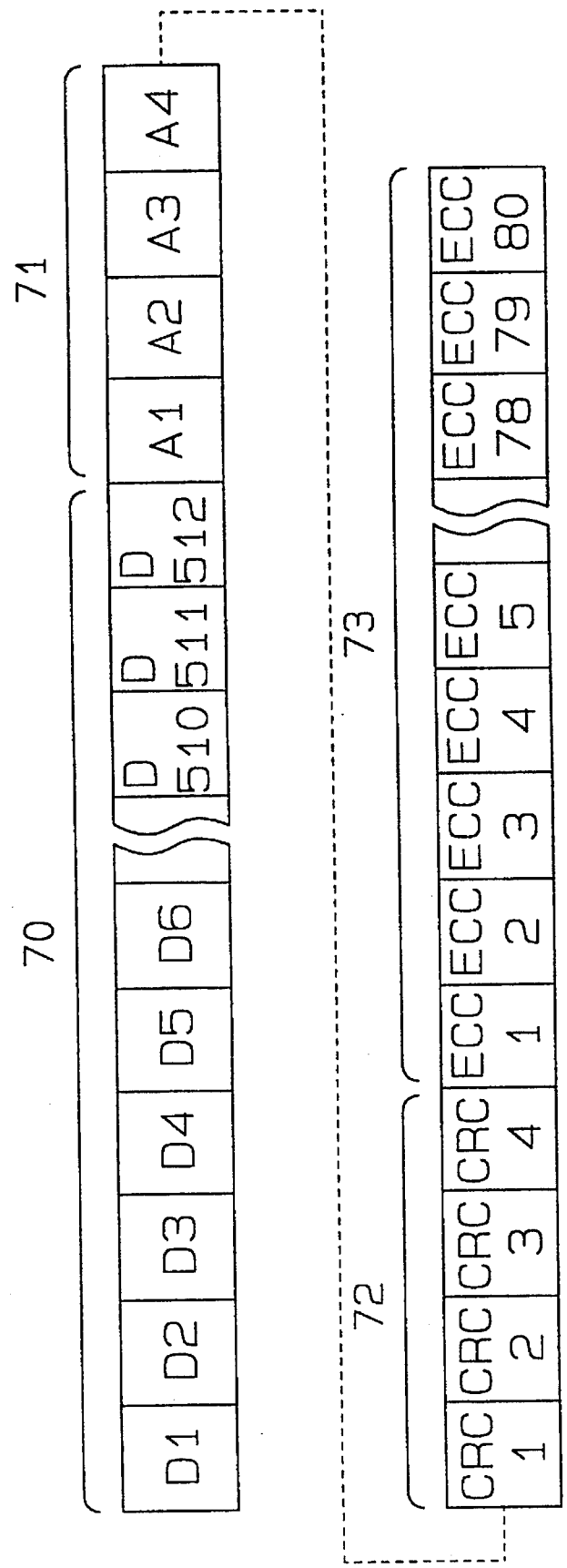
Figure 9:
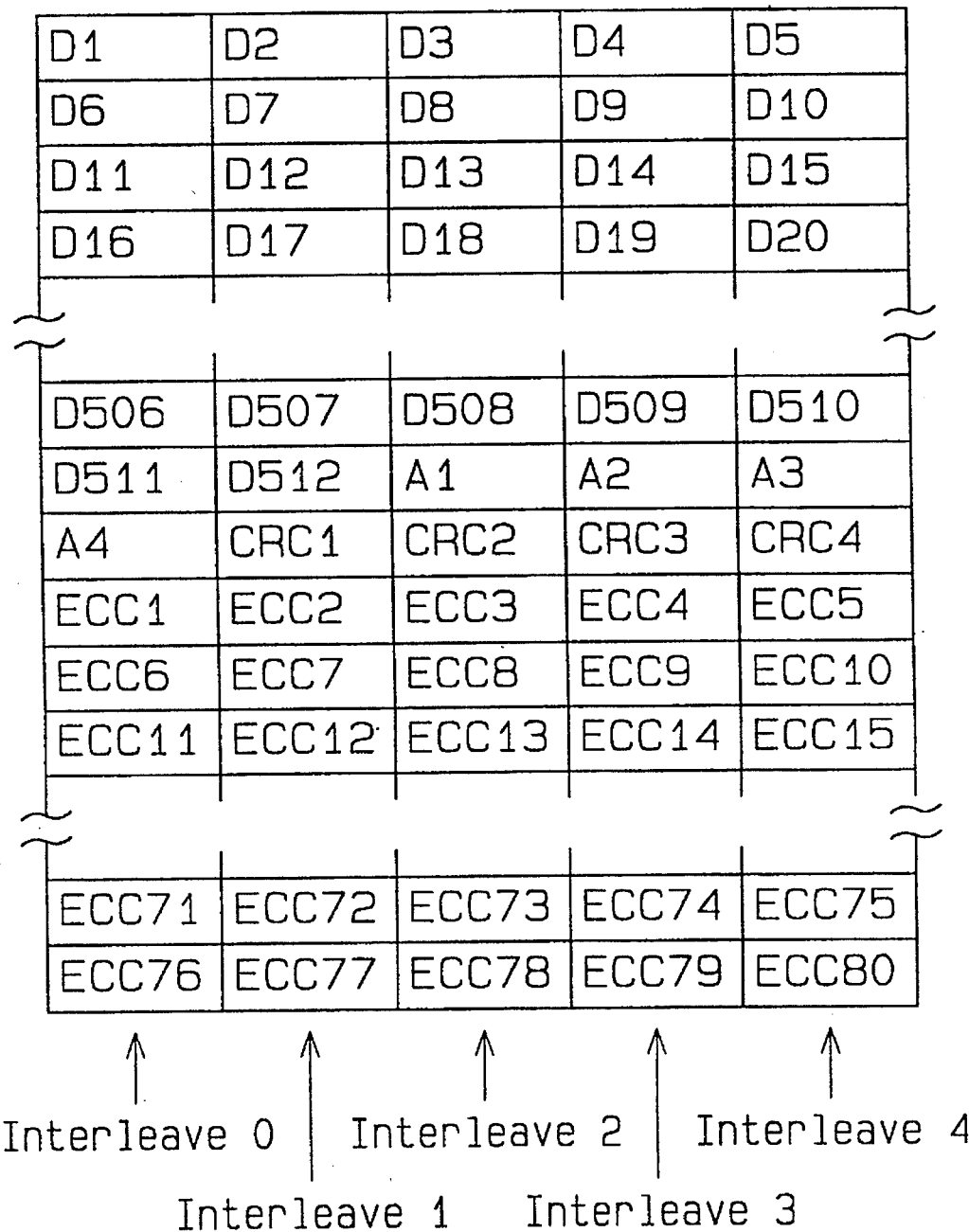

FIG. 7 shows the transfer counter circuit 83 according to this embodiment. The transfer counter circuit 83 includes five AND gates 84, 86, 87, 88 and 89, and an OR gate 85. The AND gate 84 receives the write verify signal VER from the MPU 15 and the control signal UD from the decoder 59. When the write verify signal VER and the control signal UD are both high, the AND gate 84 outputs the compare signal CMP high. The OR gate 85 receives the write verify signal VER and read enable signal RE. When the write verify signal VER and the read enable signal RE are high, the OR gate 85 outputs a high select signal SL1.

The individual AND gates 86 to 89 receive the control signals UD, SA, CR and EC from the decoder 59 respectively as well as the write enable signal WE. The AND gate 86 outputs the select signal SL5 high when the write enable signal WE and control signal UD are both high. The AND gate 87 outputs the select signal SL4 high when the write enable signal WE and control signal SA are both high. The AND gate 88 outputs a high level select signal SL2 when the write enable signal WE and control signal CR are both high. The AND gate 89 outputs the select signal SL3 high when the write enable signal WE and control signal EC are both high.

The disk apparatus 80 of this embodiment executes the write verification operation according to procedures shown in FIG. 10. In this operation, user data as a portion of the data to be written on a disk presupplied to the data buffer 12. Thereafter, the MPU 15 outputs the write verify signal VER and the reset signal/RESET at a high voltage level, and the read enable signal RE and the write enable signal WE at a low voltage level.

When the transfer counter circuit 83 receives the transfer request signal TR from the formatter 19, the first and second counters 57 and 58 are enabled to perform a counting operation and the inverted output signal/Q of the data flip-flop 62 goes low. The comparator circuit 36 receives the read data 19a, read from the disk 13, via formatter 19. Every time the clock signal CLK is input, the second counter 58 counts the number of the interleave which has the current focus. When the signal ILV2 from the second counter 58 changes to "1", the first counter 57 functions in synchronism with the clock signal CLK to identify relevant data in the interleave. Every time the clock signal CLK is input, the NOR gate 63 outputs the inverse of the CLK signal as the transfer clock signal DCLK.

During the time that the control signal UD is output at a high level from the decoder 59, the AND gate 84 outputs the high level compare signal CMP. Also during this time, the comparator circuit 36 receives the user data from the data buffer 12 and the read signal 19a from the formatter 19. The comparator 40 in the comparator circuit 36 compares the user data portion 70 in the data to be written with the user data portion 70 in the read data byte by byte, and outputs the comparison signal S1 reflecting the comparison result. The comparator circuit 36 also counts the number of unmatched bytes for each interleave.

While the write verify signal VER is high, the OR gate 85 of the transfer counter circuit 83 keeps outputting the high level select signal SL1. Since the write enable signal WE is low at that time, the select signals SL5, SL4, SL2 and SL3 from the respective AND gates 86 to 89 remain low as well. Therefore, the read data 19a is output as the output signal 37a from the fifth multiplexer 37.

While the control signal SA is high, the sector address data in the read data 19a is latched in the read sector address register 35 and is sent onto the bus 20. Since the select signal SL1 is high, the user data portion 70, sector address portion (sector address data) 71 and CRC code portion 72 in the read data 19a are input to the CRC processor 34. While the control signals CR and EC are both low, the CRC processor 34 performs a CRC operation. The results of the CRC operation are output by the CRC processor 34 to the multiplexer 37 when both the control signal CR changes to "1" and the control signal EC changes to "0".

Since the select signal SL1 is high, the user data portion 70, sector address portion 71 and CRC code portion 72 in the read data 19a are also input to the ECC/syndrome processor 33. When the control signal EC is "0", the processor 33 executes an ECC operation based on that data, and thereby produces an error correction parity. The error position/value processor 17 computes the error position and erroneous value, based on the result of the operation in the ECC/syndrome processor 33 and on the result of the comparison in the comparator circuit 36.

During the execution of the write verification operation according to this embodiment, the user data portion 70 in the read data from the disk is compared with the user data portion 70 in the written data, and error correction is performed on all of the user data portion 70, sector address portion 71, CRC code portion 72 and ECC code portion 73 in the read data. The MPU 15 compares the number of errors, found between the user data portion 70 in the written data and the user data portion 70 in the read data, with the number of errors in the user data portion 70 following the error correction performed on the read data.

If data erasure from the disk 13 or data writing to disk 13 has failed, the result of the comparison (i.e., the number of errors) between the user data portions 70 in the written data and read data will not coincide with the comparison result after error correction (i.e., with the number of errors in user data portion after error correction). If the two numbers of errors coincide with each other at a time when the number of errors in the whole sector after error correction is equal to or smaller than a predetermined reference value, the data writing on the disk can be accurately determined as having been successful. If the two numbers of errors do not match with each other, on the other hand, it can safely be determined that the data writing on the disk has been unsuccessful.

According to this invention, the write verification can be performed on the sector address data as well as on the user data. Suppose that the sector address data is written together with the user data and parity (i.e., CRC data and ECC data) on the disk 13. The disk apparatus 80 of this embodiment performs an error correction on the sector address data in the data read from the disk 13. Based on the result of the comparison between the two sector address data, it can thereafter be verified whether the sector currently subjected to write verification is the correct one. More specifically, the sector address data read from the disk is stored to the read sector address register 35 so that the MPU 15 can access the sector address data. The MPU 15 corrects the sector address data, based on the result of processing by the error position/value processor 17, and compares the sector address data in the written data with the sector address data in the read data after error correction.

According to this write verification method of comparing address data, it is possible to avoid using a sector different from that of the target sector during the verification process. It is thus possible to prevent data writing from being erroneously determined as successful when in fact it is not. This method effectively prevents an erroneous determination in the write verification due to a wrong sector address even for an optical disk which has very narrow track pitches.

Although only one embodiment of the present invention has been described herein, it should be apparent to those skilled in the art that the present invention may be embodied in many other specific forms without departing from the spirit or scope of the invention. Therefore, the present example and embodiment are to be considered as illustrative and not restrictive and the invention is not to be limited to the details given herein, but may be modified within the scope of the appended claims.

What is claimed is:

1. A method of verifying accurate writing of data onto a recording medium, the data including at least a user data portion, the method comprising the steps of:

providing data to be written on the recording medium;

writing said provided data onto the recording medium;

reading data written on the recording medium from the recording medium;

comparing a user data portion in said data to be written on the recording medium with a user data portion in said data read from said recording medium, so as to count a first number of errors between said both user data portions;

performing an ECC error correction on said data read from the recording medium, to count a second number of errors with respect to said user data portion in said read data; and comparing said first number of errors with said second number of errors, so as to determine that data writing on the recording medium has been accomplished accurately if the first number of errors and second number of errors coincide, and to determine that data writing has been accomplished inaccurately if the first and second numbers of errors do not coincide.

2. The method according to claim 1, wherein each piece of data to be written on and/or read from the recording medium includes a sector address data portion in addition to the user data portion; and wherein the method further comprises the steps performing an error correction on said sector address data portion in data read from the recording medium; and comparing said sector address data portion in said data to be written on the recording medium with said sector address data portion in read data after said error correction, so as to verify if a sector currently subjected to write verification is a correct one.

3. An apparatus for controlling data transfer between a disk driver for a disk as a recording medium and a data buffer, and for verifying if data is correctly written on the recording medium in response to a verification signal (VER), the apparatus comprising:

a formatter for exchanging data between the apparatus and the disk driver;

a comparator circuit having first and second terminals for receiving data, for comparing two pieces of data respectively input to said first and second terminals so as to count a first number of errors representing a number of unmatches between said two pieces of data, wherein said first terminal receives data, read from the disk, from said formatter;

first circuit means for supplying data to the data buffer, said data being written on the disk;

second circuit means, provided between the data buffer and said second terminal of said comparator circuit, for supplying data from the data buffer to said comparator circuit;

an ECC error correction processor for executing an error correcting operation to produce a parity based on data read from the disk, and for counting a second number of errors in said data read from the disk;

a transfer control circuit for controlling data supply to said error correction processor, said transfer control circuit continuing to supply data from said formatter to said ECC error correction processor while the apparatus is in write verification mode in response to the verification signal (VER); and determining means for comparing said first number of errors with said second number of errors to determine the data writing on the recording medium has been accomplished accurately if the first number of errors and the second number of errors coincide, and to determine the data writing has been accomplished inaccurately if the first and second numbers do not coincide.

4. The apparatus according to claim 3, wherein said transfer control circuit includes:

a multiplexer for receiving a plurality of inputs including an input from said formatter, said multiplexer having an output terminal connected to said ECC error correction processor; and a transfer counter circuit for receiving the verification signal (VER), and for controlling said multiplexer in such a way that said multiplexer selects said input from said formatter as long as the verification signal (VER) instructs a write verification.

5. The apparatus according to claim 4, wherein said transfer counter circuit includes an OR gate for receiving the verification signal (VER) input to said transfer counter circuit, and for outputting a signal to control said formatter.

6. The apparatus according to claim 3, wherein said second circuit means includes a register (29) having an input terminal connected to the data buffer and an output terminal connected to said second terminal of said comparator circuit.

7. The apparatus according to claim 3, wherein said first circuit means includes a small .computer system interface controller for accomplishing data communication between the apparatus and an external device.

* * * * *